Patented June 20, 1933

1,915,152

UNITED STATES PATENT OFFICE

WILLIAM S. CALCOTT, OF PENNS GROVE, NEW JERSEY, JULIUS A. NIEUWLAND, OF NOTRE DAME, SOUTH BEND, INDIANA, AND FREDERICK B. DOWNING, OF CARNEYS POINT, NEW JERSEY, ASSIGNORS TO E. I. DU PONT DE NEMOURS & COMPANY, OF WILMINGTON, DELAWARE, A CORPORATION OF DELAWARE

PROCESS FOR THE RECOVERY OF COPPER FROM SPENT REACTION MASSES

No Drawing. Application filed May 29, 1929. Serial No. 367,117.

This invention relates to processes involving the reaction of acetylene in the presence of a catalyst and is more particularly directed to the recovery of the catalyst from the resulting spent reaction masses.

It has been shown in the application of Nieuwland 153,210 filed December 7, 1926, and 305,866 filed September 13, 1928, that cuprous chloride, or cuprous chloride in the presence of copper, is adapted for use as a catalyst in reactions of acetylene and particularly in those reactions of acetylene in which the acetylene may be considered to function as the anhydride of acetaldehyde or its tautomer vinyl alcohol. Thus, it was shown that when acetylene is passed into a mixture of cuprous chloride and aniline ethylidine aniline is produced and that when acetylene is passed into a solution of ammonium chloride and cuprous chloride hydrocarbons of higher molecular weight are produced.

However, when such solutions of cuprous chloride or solutions containing suspended copper and cuprous chloride are used to bring about catalytic reactions of acetylene, non-volatile tarry or resinous materials accumulate in the reaction mass and eventually so foul the mixture that the reaction is retarded and the catalyst finally becomes inactive and must be replaced. Such spent catalyst mixtures, which may vary in physical nature from free flowing suspensions containing pellets or granules of resin to plastic masses of catalyst and tar, contain large quantities of copper and/or cuprous chloride of high potential value for further catalytic reaction. Hitherto, these spent mixtures have been discarded because of the fact that previous experience has indicated that most substances which are capable of reacting with copper in cuprous form in the absence of acetylene polymers either do not react at all with copper in the presence of such polymers or cause further polymerization or gumming. The reason for this difficulty is that the copper present is combined with the acetylene polymers in unusually stable form.

The primary object of the present invention is therefore to avoid the loss of the copper contained in the spent catalyst mixture. Another object is the recovery of the copper in such form that it may be introduced into the reaction to provide a cyclic process.

With these objects in mind, the surprising discovery has been made that, in spite of the difficulties heretofore encountered in effecting a reaction with cuprous chloride in the presence of acetylene polymers, by the use of chlorine the copper may be economically recovered from the reaction masses described above in a condition suitable for reuse in acetylene reactions. A method for effecting such recovery has been perfected.

In general, in effecting the recovery of the copper in catalyst form in accordance with the present invention, the spent reaction mass is placed in a vessel, preferably one equipped with an agitator and there suspended in sufficient water to give a freely fluid mixture. Chlorine is then introduced into the liquid under agitation until all the available copper is converted to soluble chlorides. The copper may be recovered from this solution in various ways depending upon the desired form of the copper for reintroduction into catalytic mixtures. For example, we may divide the solution into two parts and treat one part with zinc dust, finely divided iron or any other metal, or metals capable of replacing copper in a solution of its salts until all the copper is precipitated and the replacing metal dissolved. We may then filter off the precipitated copper, add it to the remaining half of the copper solution and after a period of agitation at ordinary or elevated temperatures obtain the copper as slightly soluble cuprous chloride and copper powder which may be washed, filtered and added to catalytic reaction masses.

In this way, by appropriately proportioning the two parts of the aqueous solution originally obtained from the chlorine treatment, the recovery may be so regulated as to give a mixture of cuprous chloride and precipitated copper in the proportions originally employed or in any proportions desired for future use.

Alternatively of course if desired the precipitated treatment may be applied to the entire acqueous solution and the whole of the copper recovered as precipitated powder.

In order to disclose the details of our process the following examples are presented by way of illustration.

*Example 1*

Place in an open vessel provided with an agitator two kilos of the spent mass resulting from introducing acetylene gas into a mixture of two parts of finely divided cuprous chloride and 100 parts of aniline at slightly elevated temperatures. Add one kilo of water slowly and with agitation to obtain a freely fluid mixture or suspension. While mechanically agitating the mixture under a fume stack pass chlorine gas into the solution until the available copper is dissolved. Within the limits of economy, treatment with an excess of chlorine does no harm but aids in converting the tars and resin to a separable form. Filter the resulting copper chloride solution and determine its copper content by analysis. Add to the solution slowly and with agitation, a quantity of zinc dust electrolytically equivalent to the copper present. When reaction ceases, allow the precipitated copper to settle and test the supernatent liquor for cuprous and cupric copper, or add zinc dust to a test portion and observe the precipitation of copper. If, as is often the case, complete precipitation of the copper has not been effected, add small portions of zinc dust to the reaction mass, agitate and repeat the test until the precipitation is complete. Wash the precipitated copper by decantation first with 5% hydrochloric acid to remove unreacted zinc, then with water, filter and dry protected from the oxygen of the air. The resulting copper powder may now be used for the preparation of fresh catalyst.

*Example 2*

Treat with water and chlorine as described in Example 1 the spent mass resulting from passing acetylene into a mixture of ammonium chloride, water, cuprous chloride and copper powder in the proportions of 945 grams of ammonium chloride, 1000 grams of water, 2850 grams of cuprous chloride and 100 grams of copper powder. Filter and divide the resulting solution into two parts in substantially the proportions of 51 to 49 parts. To the larger part add slowly and with agitation an amount of iron borings approximately equivalent to the contained copper and precipitate the copper present as disclosed in Example 1. Wash the copper powder with 5% hydrochloric acid, then with water to remove iron and ferrous chloride, then add to it the remaining half of the copper chloride solution. Agitate the mixture at ordinary temperatures, or better, heat to 80–90° C. by the direct introduction of steam until all cupric copper is reduced to the cuprous stage. Cool the mixture, wash the precipitate first with 2% HCl, then with water, filter and dry protected from the oxygen of the air. The resulting mixture will contain cuprous chloride and an amount of copper powder in proportions comparable with those present in the initial fresh catalyst and may now be used in place of the fresh catalyst.

It is obvious from the foregoing description of the recovery process that the method of treatment may be varied according to the form of product desired, and may be altered in detail by those skilled in the art, without departing from the purification and isolation steps disclosed.

Thus, while the examples call for the introduction of the chlorine in gaseous form, it is obvious that it may be introduced in other ways. It will also be apparent that the application of the process is not restricted to the particular reaction of the examples. If desired, the tar and resin removed by decantation or filtration from the chlorinated solution may be burned and the copper in the ash leached out with acid and added to the main copper solution.

As many apparently widely different embodiments of this invention may be made without departing from the spirit thereof, it is to be understood that we do not limit ourselves to the foregoing examples or description except as indicated in the following patent claims:

We claim:

1. A process for recovering copper from spent reaction masses containing the same in cuprous form and resulting from reacting acetylene in the presence of cuprous chloride as a catalyst, which comprises treating a water suspension of the reaction mass with chlorine until all available copper is converted to a solution of soluble copper chlorides, dividing said solution into two parts, precipitating the metallic copper from one of said parts, adding said copper to the other of said parts and agitating until substantially all the cupric copper is reduced.

2. In the process of controlling acetylene reactions which comprises reacting acetylene in the presence of cuprous chloride and copper as a catalyst, the steps which comprise treating a water suspension of the mass with chlorine to obtain a solution of soluble copper compounds containing cupric chloride, dividing said solution into two parts, precipitating the metallic copper from one of said parts, adding said copper to the other of said parts, agitating until substantially all the cupric copper is reduced, and reemploying the resulting mixture of cuprous chloride and copper as a catalyst for the original acetylene reaction.

3. The method of recovering copper from the tarry sludges containing combined copper which result from reacting acetylene in the presence of cuprous chloride as a catalyst, which method involves treating an aqueous suspension of the sludge with chlorine until the combined copper is converted to soluble chlorides.

4. The method of recovering copper in cuprous form from a spent catalyst mass containing combined copper and resulting from reacting acetylene in the presence of cuprous chloride as a catalyst, which method comprises treating an aqueous suspension of the mass with chlorine to convert the cuprous copper to cupric chloride, separating the cupric chloride from the insoluble residue and reducing the cupric chloride to cuprous chloride.

In testimony whereof we affix our signatures.

WILLIAM S. CALCOTT.
FREDERICK B. DOWNING.
JULIUS A. NIEUWLAND.